Patented Dec. 13, 1949

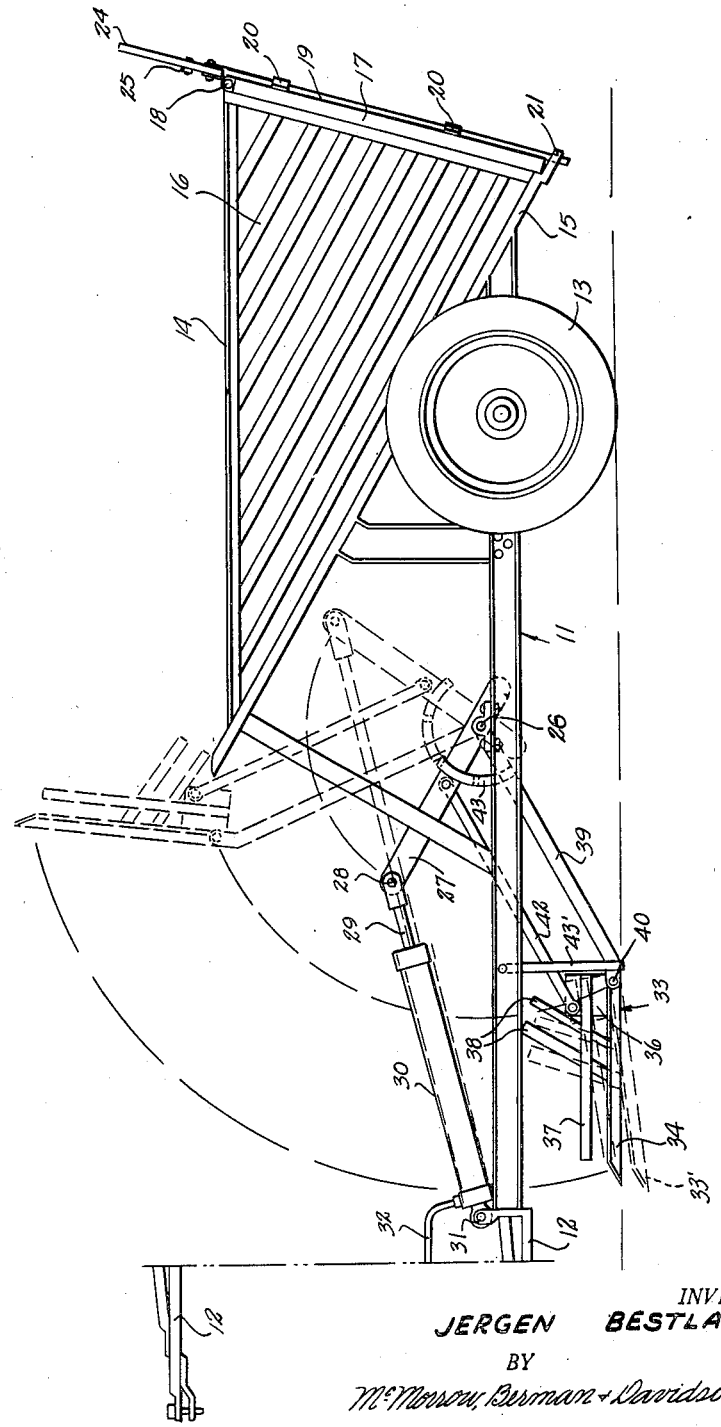

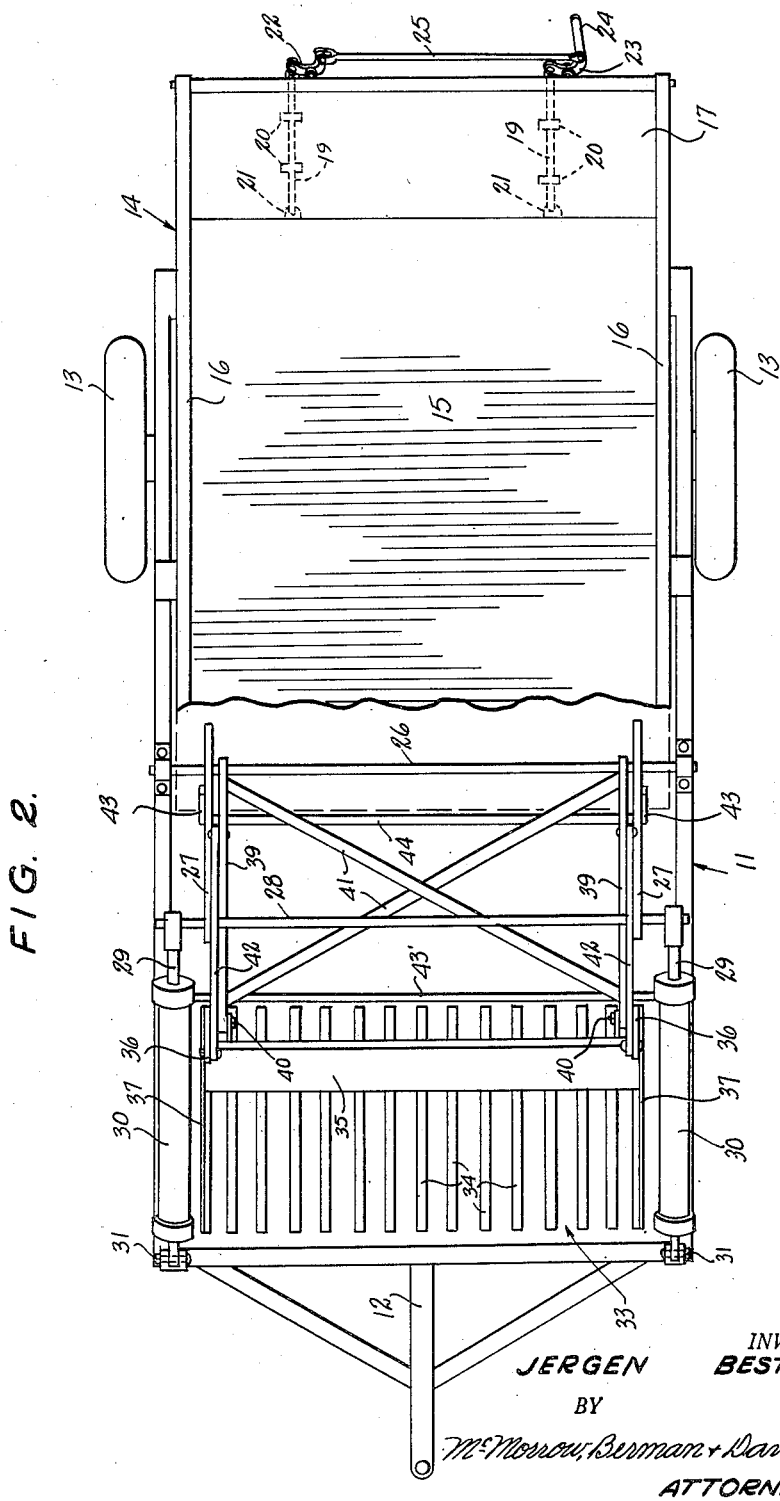

2,491,079

UNITED STATES PATENT OFFICE 2,491,079

ROCK PICKING MACHINE

Jergen Bestland, Antelope, Mont.

Application June 22, 1948, Serial No. 34,509

3 Claims. (Cl. 214—78)

This invention relates to loading apparatus, and more particularly to a stone gathering machine of the tractor-drawn type.

A main object of the invention is to provide a novel and improved rock picking machine for use in clearing farm land or the like, which is very simple in construction, easy to operate, and requires a minimum amount of human labor.

A further object of the invention is to provide an improved rock gathering machine which may be operated from a tractor and which provides means for picking up rocks and other debris and loading the material onto the machine for transportation to a suitable point of deposit, said machine being very rugged in construction, being inexpensive to manufacture, and involving only a few parts.

Further objects and advantages of the invention will become apparent from the following description and claims, and from the accompanying drawings, wherein:

Figure 1 is a side elevational view of a rock picking machine constructed in accordance with the present invention.

Figure 2 is a top plan view partly broken away, of the rock picking machine of Figure 1.

Referring to the drawings, 11 designates a generally rectangular frame provided at its forward end with a hitch bar 12 which may be connected to the drawbar of a tractor. Journalled to the rear portion of the frame 11 are the supporting wheels 13, 13. Secured on the rear portion of frame 11 is a hopper 14 having a rearwardly and downwardly inclined bottom wall 15, vertical side walls 16, 16 and a rear wall or gate 17 hinged transversely to the upper rear portion of the hopper at 18. Designated at 19, 19 are bar members slidably substantially vertically in respective pairs of brackets 20, 20 secured to gate 17, said bar members being engageable at their lower ends in apertured lugs 21, 21 projecting from the rear edge of bottom wall 15, and being pivotally connected at their top ends to the ends of bent levers 22, 23 pivoted to the top edge of gate 17. Lever 23 has a handle portion 24, and connecting lever 22 to lever 23 is a link rod 25, whereby both levers may be simultaneously rocked by actuating handle 24. Clockwise rotation of handle 24, as viewed in Figure 2, elevates bar members 19, 19 and disengages them from lugs 21, 21, releasing the gate 17.

Rotatably secured to the intermediate portion of frame 11 is a transverse shaft 26 carrying arms 27, 27 secured thereto adjacent the ends thereof. Extending through the forward ends of arms 27, 27, as viewed in Figure 2, is a transverse shaft 28, and pivotally connected to the ends of shaft 28 are the ends of respective plungers 29, 29 projecting from hydraulic cylinders 30, 30 pivotally connected at 31, 31 to the forward end of frame 11. Cylinders 30, 30 are connected by conduits 32 to the hydraulic power cylinder of the tractor.

Designated at 33 is a scoop member comprising a plurality of parallel pointed rake teeth 34 rigidly secured to a transverse bar member 35. At the sides of scoop member 33 adjacent its rear end are upstanding plate members 36, 36 to which are secured longitudinal side bars 37. Rigidly secured to the side bars 37 and the end rake teeth 34 are upstanding spaced bar members 38, 38, defining side walls for the scoop member 33.

Rotatably connected to the shaft 26 are bar members 39, 39 which are rigidly secured to arms 27 by arcuate straps 43, 43 and which are pivotally connected at 40, 40 to the lower rear corner portions of scoop member 33. Bar members 39, 39 are rigidly connected by diagonal cross bars 41, 41. Linking the upper forward corner portions of plate members 36 to the intermediate portions of arms 27 are respective link bars 42 which are parallel to the respective bars 39.

Pivoted transversely to the frame 11 is a depending U-shaped sling member 43' which underlies the forward ends of the bars 39, 39 and limits downward movement of said bars beyond the full line position thereof shown in Figure 1.

When hydraulic fluid under pressure is admitted to cylinders 30, 30, the plungers 29, 29 will be extended rearwardly, rotating arms 27, 27 clockwise, as viewed in Figure 1, and causing the scoop member 33 to be swung upwardly to the dotted line position illustrated due to the connection to the plate members 36 of the link bars 42. The material gathered in the scoop member 33 is therefore dumped rearwardly into the hopper 14. When the fluid is released from cylinders 30, the scoop will return to its normal ground-engaging position by gravity.

Normally, enough fluid is maintained in cylinders 30, 30 to maintain the scoop member 33 in the horizontal position shown in full line view in Figure 1, whereby loose material such as stones and the like, is gathered into said scoop member as the tractor moves the machine forwardly. Sling member 43' provides a bearing for supporting the ends of bar members 39 when the scoop member 33 is in this normal gathering position. The scoop member may be tilted below this position, however, by exhausting the cylinders 30, 30, whereby the scoop member drops to the dotted line position shown in the lower portion of Figure 1 at 33'. Under these conditions, the machine may be employed for digging rocks or other obstructions out of the ground.

Whenever the scoop member 33 becomes filled with material, it is swung upwardly by admitting fluid into cylinders 30, 30, causing the material to be dumped rearwardly into hopper 14, as above described. When hopper 14 is full, the machine is hauled to a suitable dumping point and the hopper 14 is emptied by releasing gate 17.

To maintain the arms 27, 27 parallel, the arcuate bars 43, 43 are preferably connected by a transverse bar member 44 rigidly secured at its ends to the respective bars 43, 43.

While a specific embodiment of a rock gathering machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A rock gathering machine comprising a wheeled frame, a hopper carried on the rear portion of said frame, a transverse shaft carried by the frame at its intermediate portion, a pair of arms pivoted to said transverse shaft at the respective sides of the frame, a pair of fluid pressure cylinders pivoted to the forward end of the frame at the respective sides thereof, plungers in said cylinders pivotally connected to the ends of the respective arms, a forwardly directed scoop member secured to said arms, said scoop member being swingable upwardly to a position facing rearwardly into said hopper responsive to extension of said plungers from said cylinders, and a U-shaped sling member pivoted to and depending transversely from said frame in underlying relation to the rear portion of said scoop member.

2. A rock gathering machine comprising a wheeled frame, a hopper carried on the rear portion of said frame, a transverse shaft carried by the frame at its intermediate portion, a pair of arms pivoted to said transverse shaft at the respective sides of the frame, a pair of fluid pressure cylinders pivoted to the forward end of the frame at the respective sides thereof, plungers in said sylinders pivotally conected to the ends of the respective arms, forwardly directed parallel bar members secured to the rear portions of said arms and rigid therewith, a forwardly directed scoop member pivotally connected to the ends of said bar members, link bars parallel to the respective bar members connecting the scoop member to the respective arms, whereby said scoop member is swingable to an elevated rearwardly facing position responsive to extension of the plungers from the cylinders, and a U-shaped sling member pivoted to and depending transversely from said frame in underlying relation to the forward end portions of said bar members.

3. A rock gathering machine comprising a wheeled frame, a hopper carried on the rear portion of said frame, a transverse shaft carried at the intermediate portion of said frame, a forwardly facing scoop member pivoted to said shaft, said scoop member being swingable to an elevated position facing rearwardly into said hopper, a fluid pressure cylinder pivoted to the forward portion of the frame, a plunger in said fluid pressure cylinder, an upwardly inclined forwardly directed arm conected to said scoop member, mean pivotally connecting the end of said arm to the end of the plunger, whereby extension of said plunger rotates the scoop member upwardly, and a U-shaped sling member pivoted to and depending transversely from said frame in underlying relation to the rear portion of said scoop member.

JERGEN BESTLAND.

REFERENCES CITED

The following references are of record in the file of this patent:

UNITED STATES PATENTS

| Number | Name | Date |
| --- | --- | --- |
| 515,679 | Hawkins | Feb. 27, 1894 |
| 1,540,940 | Howard et al. | June 9, 1925 |
| 1,625,560 | Morris | Apr. 19, 1927 |
| 2,234,599 | Johnston | Mar. 11, 1941 |
| 2,296,085 | Boldt | Sept. 15, 1942 |
| 2,453,384 | Renken | Nov. 9, 1948 |